A. A. GLIDDEN, E. P. DORMAN & G. L. FINCH.
APPARATUS FOR TREATING RUBBER FOOTWEAR.
APPLICATION FILED JAN. 21, 1915.
1,228,904.
Patented June 5, 1917.
5 SHEETS—SHEET 4.
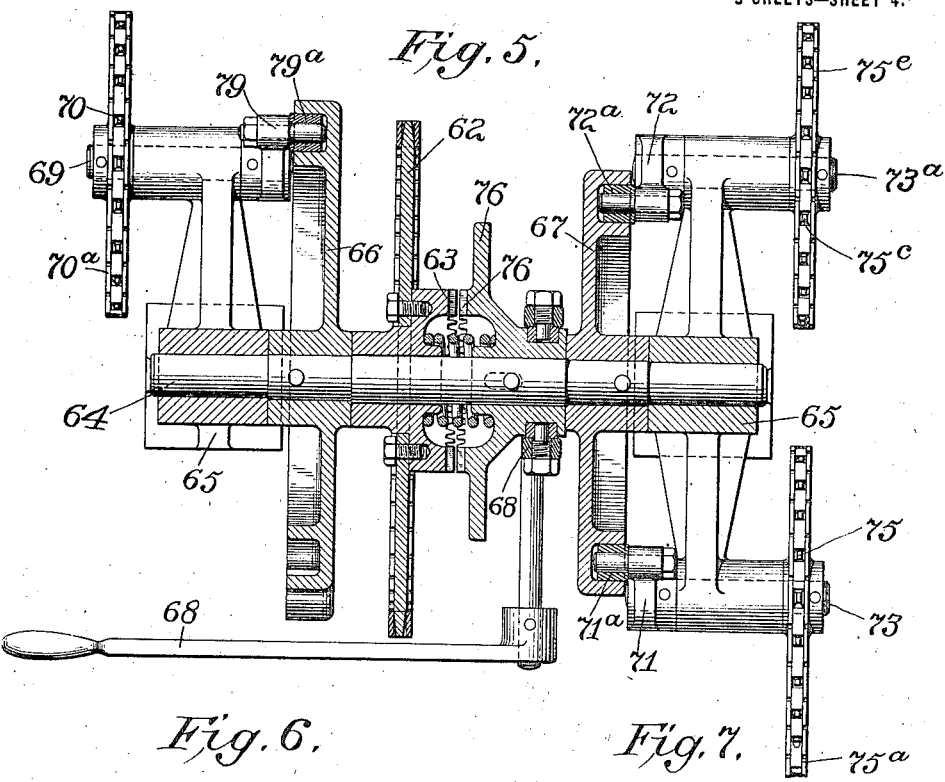
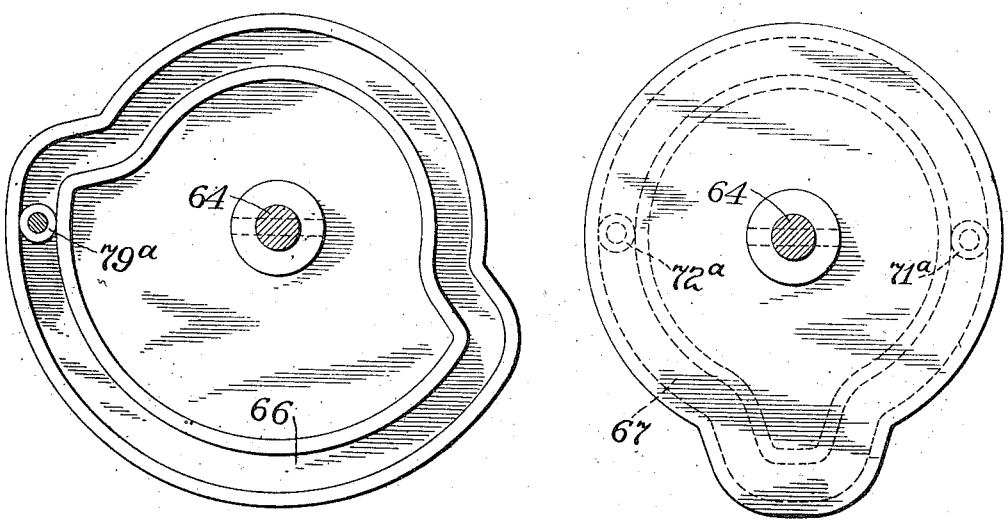
Attest:
Ewd L. Tolson
C. M. Hamilton
Inventors:
Alfred A. Glidden,
George L. Finch, &
Edgar P. Dorman,
by Middleton Middleton
Attys

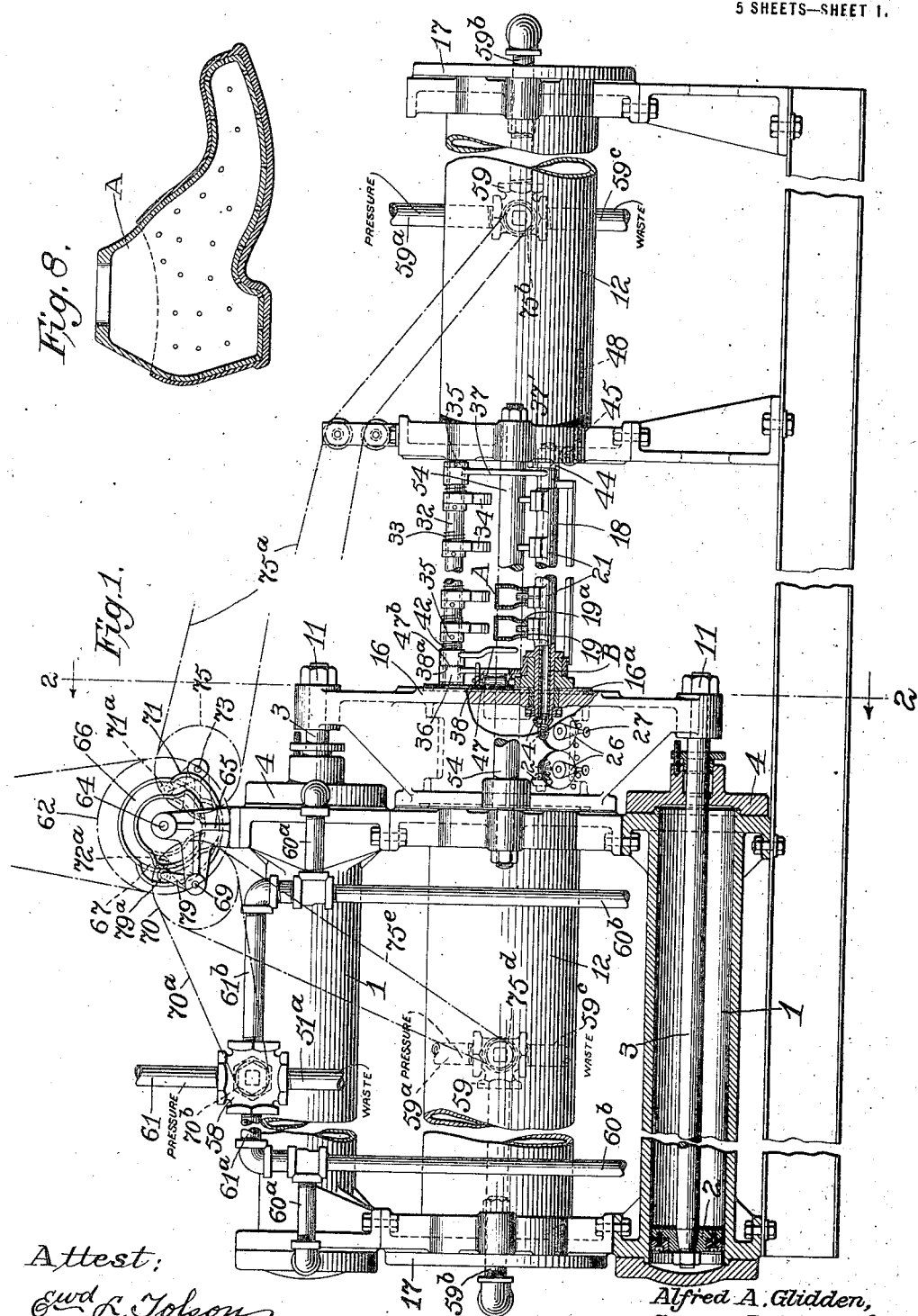

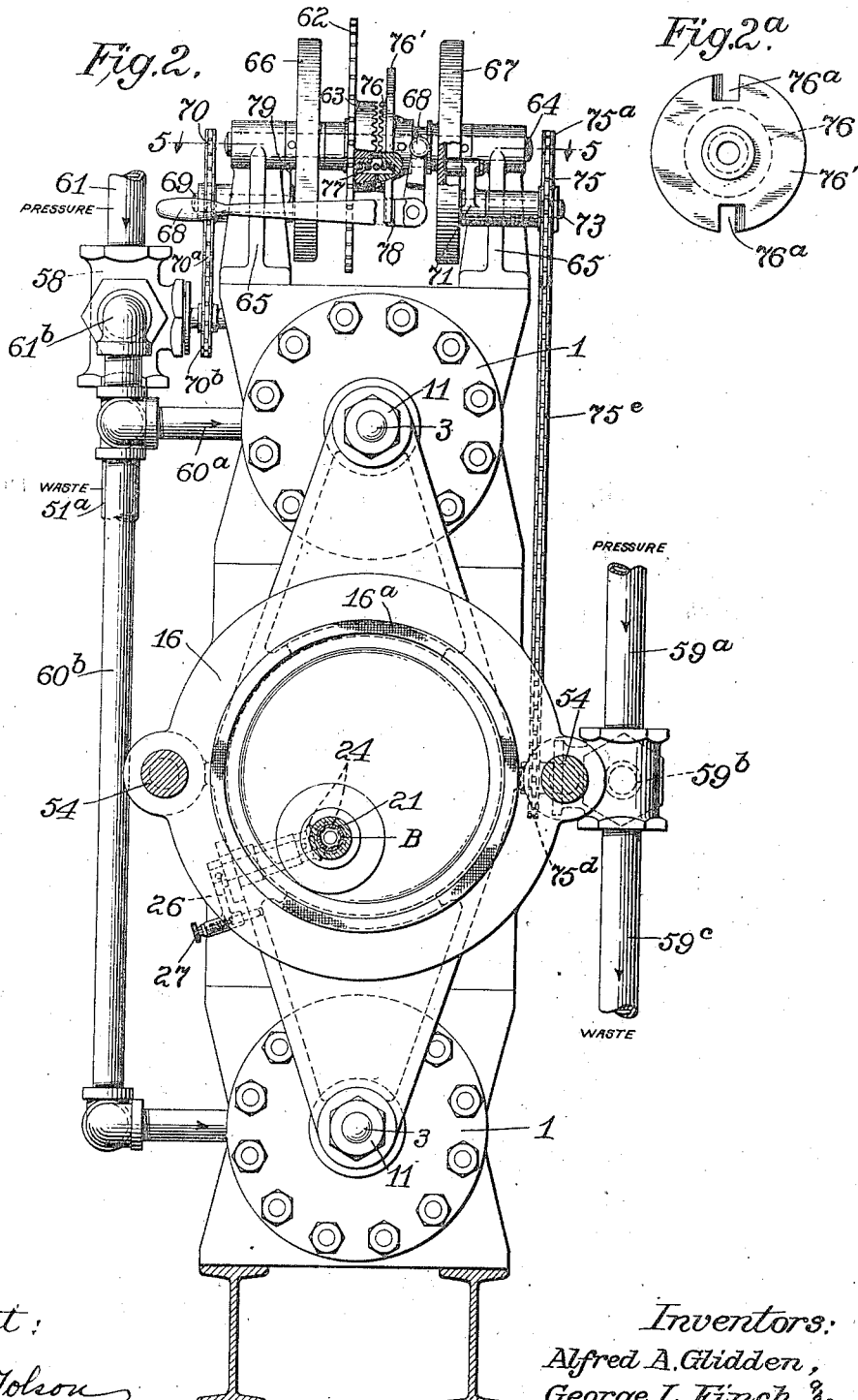

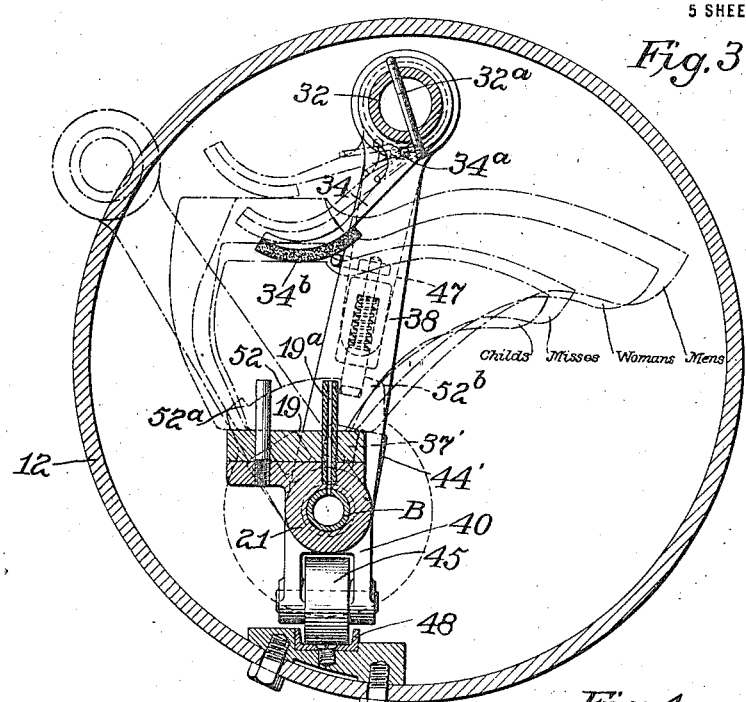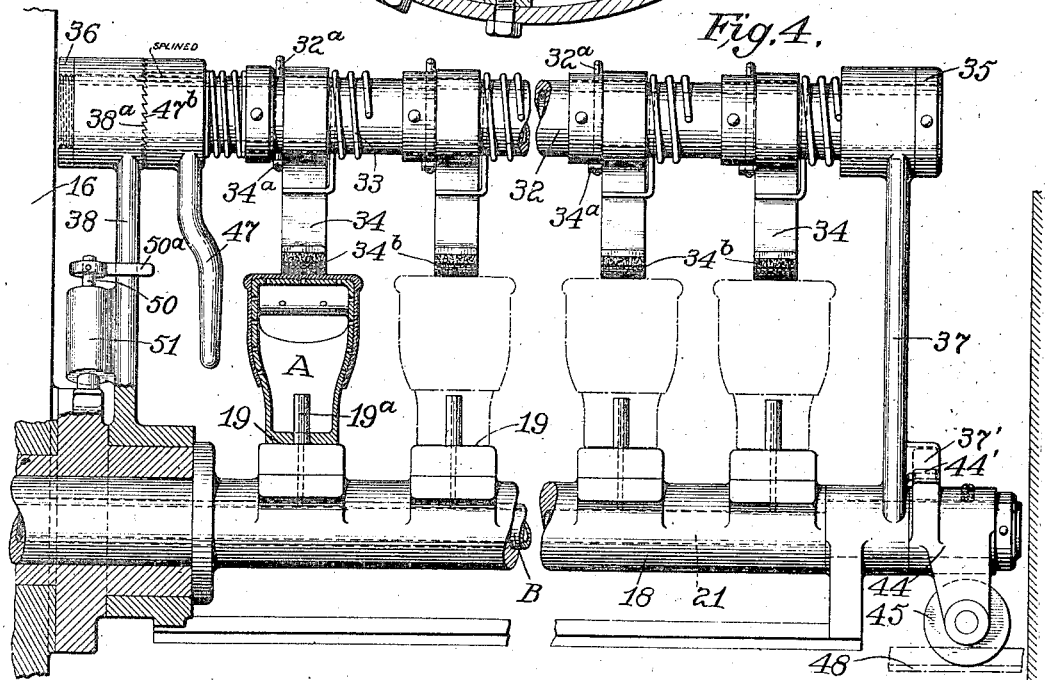

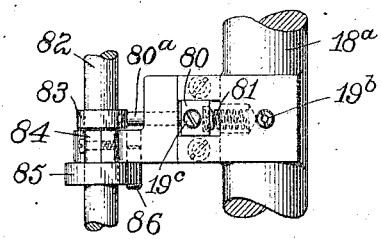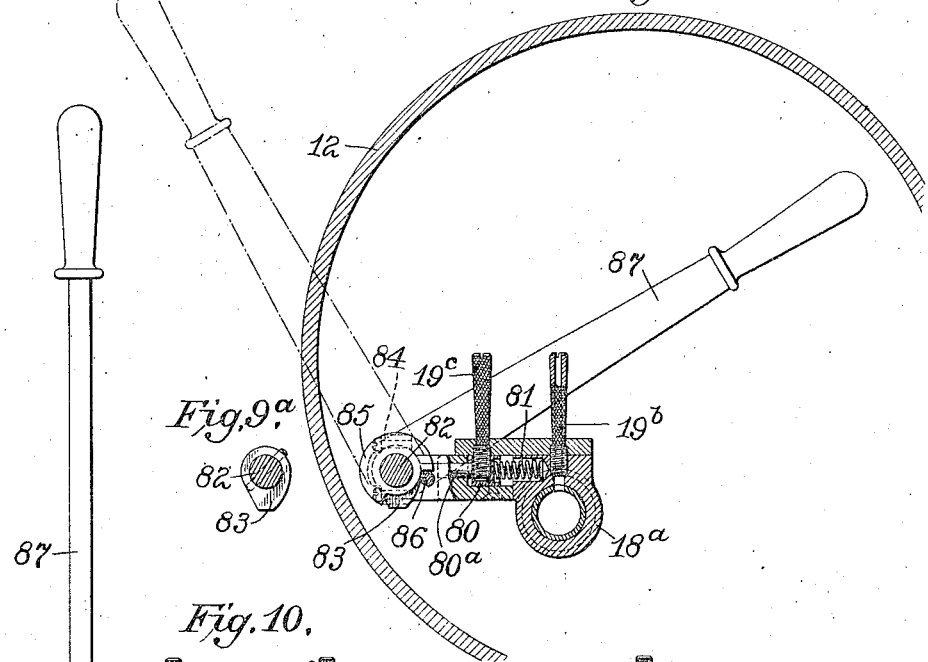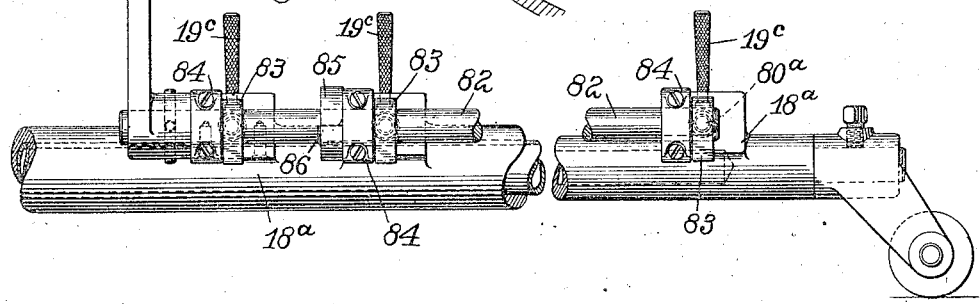

though one of the receiving cylinders show-

UNITED STATES PATENT OFFICE.

ALFRED A. GLIDDEN, OF WATERTOWN, EDGAR P. DORMAN, OF BOSTON, AND GEORGE L. FINCH, OF BRIGHTON, MASSACHUSETTS, ASSIGNORS TO HOOD RUBBER CO., OF WATERTOWN, MASSACHUSETTS, A CORPORATION OF MASSACHUSETTS.

APPARATUS FOR TREATING RUBBER FOOTWEAR.

1,228,904.   Specification of Letters Patent.   Patented June 5, 1917.

Application filed January 21, 1915. Serial No. 3,573.

*To all whom it may concern:*

Be it known that we, ALFRED A. GLIDDEN, a citizen of the United States, residing at Watertown, Massachusetts, EDGAR P. DORMAN, a subject of Great Britain, residing at Boston, Massachusetts, and GEORGE L. FINCH, a citizen of the United States, residing at Brighton, Massachusetts, have invented certain new and useful Improvements in Apparatus for Treating Rubber Footwear, of which the following is a specification.

Our present invention relates to an apparatus for applying fluid pressure to the outside of plastic articles such for example as rubber foot wear, while upon the lasts or forms upon which they are formed or assembled and prior to vulcanization.

For convenience we will hereinafter describe our invention as embodied in an apparatus for treating rubber footwear, but it will be understood that we do not limit ourselves to this particular use.

Heretofore in the manufacture of rubber foot wear, as the various parts or pieces are applied to the last, it has been customary to roll or press them into position by a hand roller or device requiring considerable labor; which, if not thoroughly performed, produces defective articles.

It has been found that this pressing or compacting of the shoe material on the last may be advantageously performed by air or other fluid pressure after assembly upon lasts and prior to vulcanization, thus eliminating much of the hand labor and producing a more uniform product.

The object of the invention is to provide a simple, economical and efficient apparatus by which a compacting air or other fluid pressure may be applied to the foot wear rapidly and which will be as nearly automatic in its action as practicable, thereby enabling the foot wear to be treated in large numbers with the aid of a minimum amount of unskilled labor.

With these and other objects in view, the invention includes the novel features of construction and arrangement and combination of parts hereinafter described and particularly pointed out in the claims.

An embodiment of our invention is illustrated in the accompanying drawings in which:

Figure 1 is a side elevation of the complete apparatus with parts broken away and parts in section.

Fig. 2 is a transverse vertical section of the same on the line 2—2 of Fig. 1 on an enlarged scale.

Fig. 2ª is a detail of the clutch locking disk.

Fig. 3 is an enlarged transverse section through one of the receiving cylinders showing the relative position of shoe-carriage therein.

Fig. 4 is a side elevation of the parts shown in Fig. 3 partly in section and with the cylinder omitted.

Fig. 5 is a sectional plan view of the valve controlling mechanism.

Fig. 6 is a detail face view of one of the valve controlling cams.

Fig. 7 is a similar view of the other valve controlling cam, showing its proper relation to the first, and, Fig. 8 is a sectional detail of one of the perforated metal lasts with a rubber shoe thereon.

Fig. 9 is a transverse sectional view of a modification.

Fig. 9ª is a sectional detail.

Fig. 10 is a side elevation of parts shown in Fig. 9 with the cylinder omitted, and Fig. 11 is a detail plan view.

In these drawings, we have shown as an example an apparatus adapted for handling four sizes of rubber overshoes.

This apparatus comprises a pair of cylinders 12 closed at their outer ends by the covers 17 and open at their inner ends, which inner ends are spaced from each other as shown. Between these open ends of the cylinder is located a reciprocating head 16 which has its opposite faces adapted to hermetically close the open ends of the cylinders when brought into contact therewith, by means of packing rings or gaskets 16ª.

Projecting from each face of the head is a last carrier which is shown in the drawings as taking the shape of a hollow rod or bar 21 which is designed, when the head is in contact with and closes the mouth of the cylinder, to lie within and extend practically the entire length of the cylinder. The outer ends of the bars 21 are provided with anti-friction rollers or wheeled carriages 44 traveling on tracks 48 in the bottoms of the cylinders. These hollow bars 21 communicate with the atmosphere through the head, and are provided with faces 19 and nipples 19ª adapted to engage and support the hollow lasts A so that the interior of said lasts will be in communication with the atmosphere through said hollow bars. It will be understood that the lasts are perforated so that any air imprisoned between the lasts and shoes is free to escape to the interior of the lasts when pressure is applied to the exterior of the shoes.

By causing the head to reciprocate so as to close first one cylinder, and then the other, the shoes carried by the bar upon one side may be subjected to the fluid pressure within the cylinder while the other bar is being loaded, or the treated shoes thereon if any replaced by untreated goods.

While various means might be adapted for supporting and reciprocating the head 16, we prefer to use hydraulic cylinders 1 within which are located pistons 2, the piston rods 3 of which project through suitable stuffing boxes on the heads 4 of the hydraulic cylinders and are secured to projections or parts of the reciprocating head 16 by means such as nuts 11.

The pressure fluid for operating the pistons to reciprocate the head is supplied by pipe 61 connected to any suitable source (not shown) of fluid under pressure, this pipe connecting with a four-way valve casing 58 from which pipes 61ª and 61ᵇ lead to opposite ends of the cylinders with which they connect by branches 60ª and 60ᵇ.

A waste pipe 51ª also connects with the valve casing 58. The fluid pressure to each of the cylinders 12 is supplied by a pipe 59ª leading from any suitable source of fluid under pressure (not shown), this pipe communicating with a three-way valve casing 59, which latter connects by pipe 59ᵇ with the end of the cylinder through head 17.

The three-way valve casing 59 is also provided with a waste or exhaust outlet indicated at 59ᶜ.

In order to secure the proper sequence of operations and to save the time of the operator, we provide a mechanical appliance, which, once started by the operator, controls the hydraulic supply to the cylinders and allows the proper time to elapse from the admission of pressure to the hydraulic cylinders for the head 16 to close either cylinder before admitting air under pressure to this cylinder.

This device comprises a continuously running sprocket 62 carrying on its face one member 63 of a jaw clutch, which is mounted freely on a shaft 64 supported in brackets 65 from the frame of the apparatus. Two cams 66 and 67 are keyed to this shaft, and control respectively through cam levers and sprockets and chains, the hydraulic and air valves as hereinafter described. The other member 76 of the jaw clutch is keyed to the shaft but is free to reciprocate on it, so as to allow of engagement and disengagement of the teeth. This member carries a disk 76' provided with notches or interruptions 76ª diametrically opposite. When the clutch member 76 is forced by lever 68 into engagement with the member carried on the sprocket, it is held in engagement therewith (as soon as it has rotated a few degrees) by a locking piece 78 which bears on the face of the disk.

The hydraulic control cam 66 has a groove on its face in which rides a cam roll 79ª carried on a lever arm 79. This lever arm is keyed to a shaft 69 on the opposite end of which is keyed a sprocket 70, connected by a chain 70ª, to a sprocket 70ᵇ on the spindle of the four-way valve 58.

The air control cam 67 has a groove in its face in which ride two cam rolls 71ª and 72ª on opposite diameters, carried on lever arms 71 and 72 respectively. Lever arm 71 is mounted on a shaft 73 on the opposite end of which is keyed the sprocket 75, connected by a chain 75ª to a sprocket 75ᵇ on the end of the spindle of the 3-way valve 59, of the right-hand cylinder (Fig. 1) and lever arm 72 is carried by a shaft 73ª which in turn bears a sprocket 75ᶜ which is connected with sprocket 75ᵈ on the spindle of valve 59 of the left hand cylinder, (Fig. 1), by a chain 75ᵉ.

*Operation.*

Considering the head 16 to be in the position shown in Fig. 1 the operation of the parts described would be as follows:

The operator presses on the clutch lever 68 and forces the teeth of the clutch member 76 into engagement with the teeth of the other member 63 of the clutch against the pressure of the spring 77. When the clutch, shaft and cams have made one-half revolution, one of the interruptions 76ª on the disk 76' is brought opposite to the locking piece 78 and the spring 77 forces the clutch member 76 out of engagement with the clutch member 63 and the apparatus comes to rest and remains in this condition until started up again by the operator.

As the shaft 64 starts to rotate, the rise on cam 66 imparts movement to lever arm 79 which is transmitted through shaft, chain and sprockets to the spindle of valve 58 which is turned to admit pressure to the left end of the hydraulic cylinders. The head 16 then moves to the right until it has entered the shoe carrying bar in the right hand air cylinder and hermetically closes the same.

The air cam 67 is so timed that when this cylinder has been closed, air pressure is admitted to the right hand cylinder at the completion of the one-half revolution of the cams.

Upon starting up again the reverse of the foregoing operation takes place,—that is to say, the air is first released from the right hand cylinder 12 and time enough to empty this cylinder is allowed, before hydraulic pressure is automatically turned on to the right hand end of the hydraulic cylinders and the head 16 moves to the left hand side to close left hand cylinder 12 and admit air pressure thereto.

In order to hold the lasts firmly pressed upon the bars so that an air tight joint will be produced between the vented part of the lasts and the gaskets on the bar, we provide gripper mechanism which will now be described.

On opposite ends of the vented bar 18 are mounted the lever arms 37 and 38. These are free to swing on the bar, being controlled in their movement in either direction by stop means hereinafter more fully described. The opposite ends of these arms carry a rotatable shaft 32, whose position endwise is controlled by collars 35 and 36.

The portion of the arm 38 which forms the journal for shaft 32 has ratchet teeth 38ª cut upon it which engage with corresponding teeth 47ᵇ upon the face of the lever 47, which has its hub free to move endwise on shaft 32, but prevented from turning thereon by a sliding key or spline. The teeth of both levers are kept normally in engagement by a helical spring 42 interposed between the hub and a collar 35 fast on the shaft.

At intervals upon shaft 32 are mounted freely, finger pieces or presser arms 34, the downward or counter clockwise movement of which is controlled by pins 34ª in their faces which engage with corresponding pins 32ª in shaft 32. The movement of the presser arms in the opposite direction is controlled by coil springs 33 one end of which laps its respective presser arm and the opposite end of which is held in the shaft 32.

It will be seen from this that a movement of the lever 47 in a clockwise direction, brings the pins 32ª into engagement with the pins 34ª causing the presser arms to be lifted off the heels of the shoes; while a counter clockwise movement of lever 47 is transmitted to the presser arms 34 through the springs 33, causing said presser arms to be pressed on the soles of the footwear with a yielding pressure. The ratchet teeth 38ª and 47ᵇ hold the shaft in position to apply pressure until lever 47 is moved longitudinally against the pressure of the spring 42.

On releasing the lever 47 the spring 42 forces the teeth into engagement and so locks the shaft 32 in any angular position to which it may have been adjusted or turned. The pressure arms are provided with pressure pads 34ᵇ.

To place the shoes in position the lever arms 37 and 38, are swung back to the position shown in dotted lines. (Fig. 3.)

The shoes having been placed in position on the shoe bar, the lever arms carrying the bar are swung up to position shown in full lines and by means of lever 47 the presser arms are brought down under spring pressure on the heels of the shoes from the position shown in dotted lines to that shown in full lines.

The bars which deliver the shoes to the compressor carry respectively 8, 10 and 12 shoes according to whether they are men's, women's, and misses' or children's. Each bar is arranged to carry 12 shoes, so that when less than 12 shoes are placed on the bar, it is necessary to plug the holes in the vented pins which remain uncovered.

To take care of this, each bar is provided with a valve, in the form of a hollow sleeve B which fits the inside of the bore of the bar closely. This sleeve has slots or holes through its walls opposite the vented pins to be covered. These are so arranged that by rotating the sleeve all of the holes may be open, or two or four may be covered. The angular position of this sleeve is controlled through bevel gears 24, by a hand lever 26 on the outside of the head 16, provided with a spring pin 27 fitting into the holes in the head, to lock it in the desired position.

To limit the swinging movement of the lever arms 37 and 38 and lock them in normal position, we provide the following means: A spring pressed pin 50 is guided in a lug or bracket 51 and has its end adapted to travel over a segment 52 provided at opposite ends with stops 52ª and 52ᵇ. Adjacent stop 52ᵇ is a notch or recess (Fig. 3) into which the pin drops to lock the lever arms in normal or operative position and from which it may be withdrawn by handle 50ª. Arm 37 carries a lug or projection 37' adapted to contact with lugs or projections 44' on the head 44 to limit in a similar manner the movement of arm 37.

Instead of last supporting means such as above described, we modify the same as illustrated in Figs. 9 to 11. In this form, each last is held in position by means of two pins 19ᵇ, 19ᶜ one of which 19ᵇ is fixed in the bar 18ª and the other 19ᶜ capable of movement toward and away from the fixed pin. The fixed pin 19ᵇ is hollow and forms the vent from the last to the hollow bar 18ª. Pin 19ᶜ is carried by the sliding member 80 and is held normally away from the fixed pin 19ᵇ by the pressure of the spring 81.

82 is a shaft running practically the whole length of the bar 18ª and having cams 83 mounted at intervals on it, which engage with extensions or projections 80ª on the sliding pieces 80. This shaft is supported from the bar 18ª by bearings 84 and is limited in its angular movement by the stop collar 85 which engages with the stop pin 86. To one end of shaft 82 is keyed the operating lever 87.

To place shoes on the bar, the lever 87 is moved over to the left into the position shown in dotted line Fig. 9 rotating the shaft 82 and cams 83. The rise on the cams forces the sliding pieces 80, carrying the pins 19ᶜ toward the fixed pins 19ᵇ against the pressure of the springs 81.

The lasts are then placed in position, and the shaft and cams are rotated to the right by means of the lever 87.

The springs 81 then force the sliding pieces 80 to the left, or away from the fixed pins 19ᵇ until the inside of the opening in the last is gripped, and held, by the pins 19ᵇ and 19ᶜ.

Having thus described our invention, what we claim is:

1. An apparatus for compressing articles including plastic material comprising a receptacle having an open mouth, a reciprocating head arranged to close said mouth, a form carrier arranged to be moved into and out of said receptacle in unison with the movement of said head, and means for automatically admitting fluid under pressure to said receptacle when the same is closed.

2. An apparatus for compressing articles including plastic material comprising a receptacle arranged to be hermetically closed, a hollow form carrier insertible in and removable therefrom and having seats for the forms, the interior of the form carrier arranged to communicate with the interior of the forms and also with the exterior of the receptacle, means for supplying fluid pressure to said receptacle, means for holding the forms in place upon their seats and a rock shaft for operating said holding means.

3. An apparatus for compressing articles including plastic material comprising a receptacle adapted to be hermetically closed, a hollow form carrier insertible in and removable therefrom and having seats for the forms, the interior of the carrier being arranged to communicate with the interior of the forms and also with the exterior of the receptacle, means for supplying fluid pressure to said receptacle, means for holding each of the forms upon its seat, and means for simultaneously operating all of said holding means.

4. An apparatus for compressing articles including plastic material comprising a receptacle arranged to be hermetically closed, a hollow form carrier removable therefrom and having seats for the forms, hollow last engaging pins carried by said seats and communicating with the interior of the carrier and adapted to engage the forms and means for holding the forms on said pins.

5. An apparatus for compressing articles including plastic material comprising a receptacle adapted to be hermetically closed, a hollow form carrier removable therefrom and having seats for the forms provided with hollow nipples communicating with the interior of said carrier, and clamping means movable toward and from said nipples.

6. An apparatus for compressing articles including plastic material comprising a receptacle adapted to be hermetically closed, a hollow form carrier having a plurality of form supporting seats provided with openings to communicate with the interior of the forms and means operable from one end of the carrier for closing certain of said openings.

7. An apparatus for compressing articles including plastic material comprising a receptacle adapted to be hermetically closed, a hollow form carrier having a plurality of form supporting seats provided with openings to communicate with the interior of the forms and means for closing one or more of said openings, comprising a rotatable sleeve within the hollow carrier having non-alining openings.

8. An apparatus for compressing articles including plastic material comprising a receptacle, a head for hermetically closing the same, a hollow form carrier connected with said head, said carrier having form supporting seats, fluid pressure means for moving said head toward and from the mouth of the receptacle, and means for admitting fluid under pressure to said receptacle when closed with the carrier within the receptacle.

9. An apparatus for compressing articles including plastic material comprising a receptacle, a head for hermetically closing the same, a hollow form carrier connected with said head, said carrier having form supporting seats or nipples, and fluid pressure means for moving said head toward and from the mouth of the receptacle, and means for automatically admitting fluid under pressure to said receptacle after it has been hermetically closed with the carrier within the receptacle.

10. An apparatus for compressing articles including plastic material comprising a receptacle, a head for hermetically closing the same, a hollow form carrier connected with said head, said form carrier having form receiving seats, fluid pressure means for moving said head toward and from the receptacle to insert and withdraw the carrier, means for admitting fluid under pressure to said receptacle when the carrier is therein, and a mechanical controlling device for mechanically and successively controlling both of said fluid pressure means.

11. An apparatus for compressing articles including plastic material comprising a receptacle, a head for hermetically closing the same, a hollow form carrier connected with said head, said form carrier having form supporting seats, a hydraulic ram for moving said head toward and from the receptacle, pipe connections for admitting fluid under pressure to and exhausting it from said receptacle when the carrier is in the same, valves controlling said pipe connections and the passage of fluid to and from the ram, and a mechanical controlling device having operating connections to the stems of said valves.

12. An apparatus for compressing articles including plastic material comprising a pair of receptacles having open mouths facing each other, a reciprocating head having faces adapted to alternately close said receptacles, form carriers connected with opposite sides of said head, means for reciprocating said head, and means for alternately admitting fluid under pressure to said receptacles.

13. An apparatus for compressing articles including plastic material comprising a pair of receptacles having open mouths facing each other, a reciprocating head having faces adapted to alternately close said mouths, form carriers connected with said head and projecting in opposite directions therefrom, tracks in said receptacles, carriages supporting the outer ends of said carriers and traveling on said tracks, means for reciprocating said head, and means for alternately admitting fluid under pressure to said receptacles.

14. An apparatus for compressing articles including plastic material comprising a pair of opposed receptacles, a head having its opposite faces adapted to alternately close said receptacles, form carriers connected with said head, a hydraulic ram for moving said head, pipe connections to said ram for fluid supply and exhaust including a four-way valve, pipe connections to said receptacles for fluid supply and exhaust including a pair of three-way valves and a single mechanical device for operating all of said valves in proper sequence.

15. An apparatus for compressing articles including plastic material comprising a pair of opposed receptacles, a head having its opposite faces adapted to alternately close said receptacles, form carriers connected with said head, a hydraulic ram for moving said head, pipe connections to said ram for fluid supply and exhaust including a four-way valve, pipe connections to said receptacles for fluid supply and exhaust including a pair of three-way valves, a continuously running element, a pair of cams adapted to be clutched to said element, means whereby one of said cams operates said four-way valve, means whereby the other cam operates the three-way valves, and means for automatically unclutching said cams on the completion of a cycle of operations.

16. An apparatus for compressing articles including plastic material, comprising a receptacle arranged to be hermetically closed, a form carrier insertible in and removable from said receptacle and having seats for forms, means for holding each of the forms upon its seat, means for simultaneously operating all of said holding means, and means for supplying fluid under pressure to said receptacle.

17. An apparatus for compressing articles including plastic material, comprising a receptacle, a head for hermetically closing the same, a hollow form carrier connected with said head, fluid pressure means for moving said head toward and from the mouth of the receptacle, and means for supplying fluid under pressure to said receptacle when closed.

In testimony whereof, we affix our signatures in presence of two witnesses.

ALFRED A. GLIDDEN.
EDGAR P. DORMAN.
G. L. FINCH.

Witnesses:
EMMA G. COLLINS,
S. LOUISE STEEVES.